UNITED STATES PATENT OFFICE.

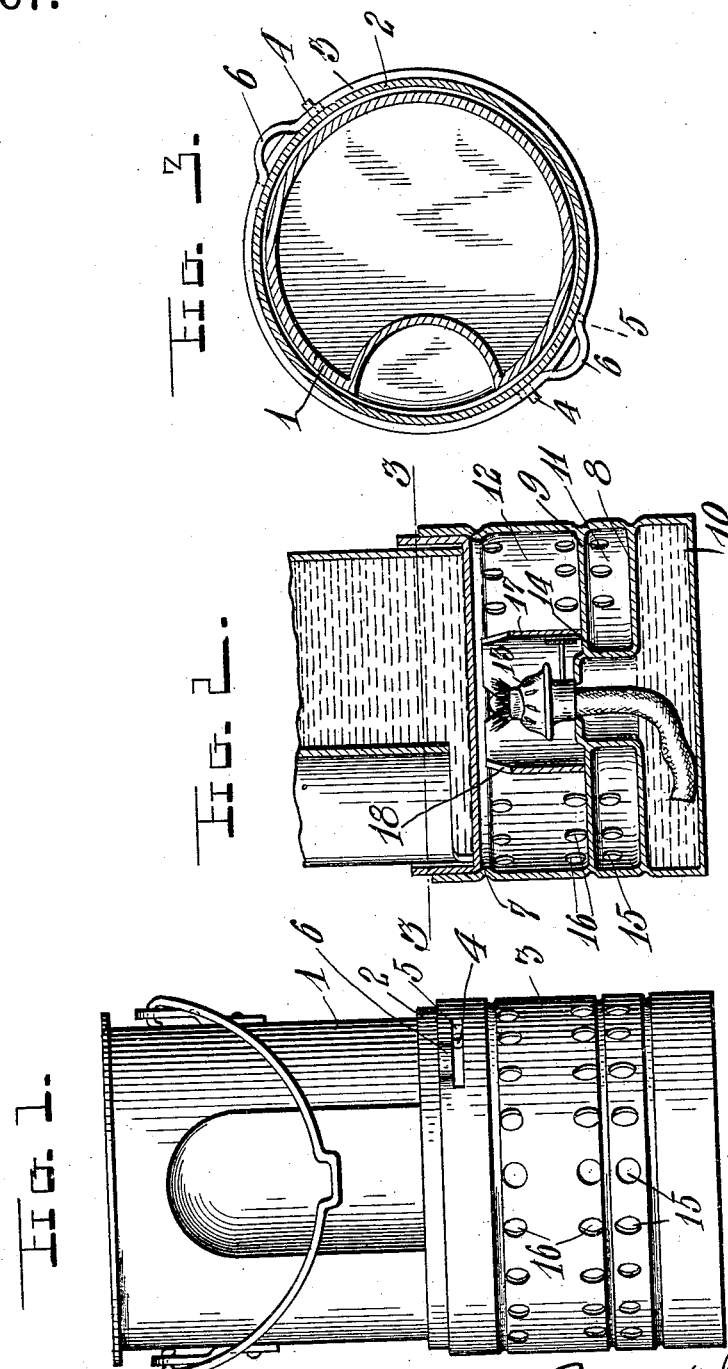

CHARLES H. FELKER, OF AVON, MASSACHUSETTS.

HEATER FOR POULTRY-WATERING DEVICES.

946,667.  Specification of Letters Patent.  Patented Jan. 18, 1910.

Application filed April 22, 1909. Serial No. 491,476.

*To all whom it may concern:*

Be it known that I, CHARLES H. FELKER, a citizen of the United States, residing at Avon, in the county of Norfolk and State of Massachusetts, have invented certain new and useful Improvements in Heaters for Poultry-Watering Devices, of which the following is a specification, reference being had to the accompanying drawings.

This invention relates to improvements in heaters for poultry watering devices and consists in the novel construction, combination and arrangement of the parts hereinafter fully described and claimed.

The object of the invention is to provide a simple and practical device of this character which may be readily connected to or removed from the watering device and which is so constructed that it may be safely used without danger of explosion or fire.

The above objects of the invention are attained in the construction illustrated in the accompanying drawings, in which—

Figure 1 is a side elevation of the improved heater showing the poultry or pigeon watering device arranged thereon, Fig. 2 is a vertical section through the heater on the lower portion of the watering device, and Fig. 3 is a horizontal section taken on the plane indicated by the line 3—3 in Fig. 2.

Referring more particularly to the drawings, 1 denotes the body or reservoir of a poultry or pigeon watering device having an open bottom removably secured in a circular pan 2 by any suitable means. Said pan 2 is removably mounted in the open top of the cylindrical body 3 of the heater, the detachable connection being effected by providing on the upright sides of the pan at diametrically opposite points, radially projecting pins 4 to enter horizontal slots 5 formed in the body 3 adjacent to its top and at opposite points. The pins 4 are permitted to enter and leave the slots 5 by stamping outwardly in the upper edge of the body 3 curved loops 6 one of which latter is arranged at one end of each of the slots 5, said loops forming grooves or channels through which the pins 4 may pass when the pan 2 and body 3 are moved vertically with respect to each other. It will be seen upon reference to Fig. 3 of the drawings that when the pan 2 is turned to move the pins 4 beneath the loops 6 the pan may be lifted vertically out of the body 3 and said pins will pass upwardly through the loops. By reversing this operation the pan may be replaced and locked to the body. To relieve this connection of strain an annular pan supporting rib 7 is stamped in the surrounding wall of the body 3 and is so positioned that the pan will engage it and be supported by it when the pins 4 enter the slots 5.

Arranged in the body 3 between its bottom and its open top are two horizontally disposed partitions 8, 9, which latter divide the body 3 into three chambers or compartments 10, 11, 12. The lowermost compartment 10 forms a reservoir for the oil burned in a heater or burner 13 which latter is disposed in the uppermost compartment 12 and is at the top of an upright tubular portion 14 uniting the two partitions 8, 9, as clearly shown in Fig. 2. The tubular part 14 communicates with the oil chamber or reservoir 10 and the wick from the burner extends downwardly through it. The intermediate compartment 11 provides a ventilating space between the burner chamber 12 and the oil in the compartment 10 thereby preventing the heat from the burner from reaching the oil; to permit of the passage of ventilating currents through the chamber 11, the surrounding wall is formed with openings 15. The surrounding wall of the burner compartment 12 is also provided with air inlet openings 16 arranged preferably in upper and lower rows as shown, a sufficient number being provided to permit of a proper supply of oxygen to the burner 13.

In order to prevent the flame of the burner from being blown out or otherwise affected by winds and drafts, a removable guard wall 17 is placed around it. Said guard 17 is in the form of an open ended cylinder which rests upon the partition 9 and has its upper edge formed with V-shaped notches 18.

From the foregoing it will be seen that the invention provides an exceedingly simple and practical heating device of this character which may be used with safety in poultry houses and other frame buildings. The peculiar construction of the chambers in the body of the heater prevent the heat from the burner from being imparted to the oil and the provision of the guard around the burner prevents the flame of the latter from being blown out or otherwise affected by drafts.

Having thus described the invention, what is claimed is:

The hereindescribed heater comprising a cylindrical body having an open top, a bottom, a surrounding wall, and lower and upper partitions spaced apart to provide a lower oil reservoir, an upper burner compartment and an intermediate ventilating compartment, the concentrically arranged upright member 14 extending through the ventilating compartment and in communication with the oil reservoir, a wick burner arranged at the top of said member 14 and in the upper compartment and having its wick extending through said member 14, the side wall of said ventilating compartment being formed with an annular series of openings to permit passage of air through said compartment and around said member 14, the side wall of said upper compartment being formed with upper and lower annular rows of air inlet openings, an upright cylindrical burner guard arranged in the upper compartment upon the upper partition and inclosing said burner, the upper edge of said guard being notched and means in the open top of the body for supporting a poultry watering pan.

In testimony whereof I hereunto affix my signature in the presence of two witnesses.

CHARLES H. FELKER.

Witnesses:
RICHARD H. COLE,
RAYMOND W. HIGGINS.